(12) United States Patent
Huang et al.

(10) Patent No.: US 11,767,207 B2
(45) Date of Patent: Sep. 26, 2023

(54) MULTI-DIMENSIONAL ADJUSTABLE FORKLIFT DRIVING SYSTEM

(71) Applicant: HANGCHA GROUP CO., LTD., Zhejiang (CN)

(72) Inventors: Xiaoping Huang, Zhejiang (CN); Zongping Jiang, Zhejiang (CN); Hao Kuang, Zhejiang (CN); Lei Mei, Zhejiang (CN); Xing Luo, Zhejiang (CN); Fengbo Yu, Zhejiang (CN)

(73) Assignee: HANGCHA GROUP CO., LTD., Zhejiang (CN)

( * ) Notice: Subject to any disclaimer, the term of this patent is extended or adjusted under 35 U.S.C. 154(b) by 0 days.

(21) Appl. No.: 17/381,218

(22) Filed: Jul. 21, 2021

(65) Prior Publication Data

US 2022/0324686 A1  Oct. 13, 2022

(30) Foreign Application Priority Data

Apr. 12, 2021 (CN) .......................... 202110388885.7
Apr. 12, 2021 (CN) .......................... 202120734469.3

(51) Int. Cl.
*B66F 9/075* (2006.01)
*G05G 1/40* (2008.04)
*B62D 1/10* (2006.01)

(52) U.S. Cl.
CPC .............. *B66F 9/0759* (2013.01); *B62D 1/10* (2013.01); *G05G 1/40* (2013.01)

(58) Field of Classification Search
CPC ...... B66F 9/0759; B66F 9/07568; B62D 1/10; B62D 1/18; B62D 1/183; G05G 1/40; B60K 37/06
See application file for complete search history.

(56) References Cited

U.S. PATENT DOCUMENTS 2,911,053 A * 11/1959 Ayers ....................... B60K 1/00
 318/284
4,608,550 A  8/1986 Umebayashi et al.
(Continued)

FOREIGN PATENT DOCUMENTS

CN      209947141 U  *  1/2020
CN      111807274 A      10/2020
(Continued)

OTHER PUBLICATIONS

Fu Y, 'Machine Translation of CN 111807274 Obtained Sep. 13, 2022', Aug. 3, 2020, Entire Document. (Year: 2020).*
(Continued)

*Primary Examiner* — James A English
(74) *Attorney, Agent, or Firm* — Yue (Robert) Xu; Apex Attorneys at Law, LLP

(57) ABSTRACT

A multi-dimensional adjustable forklift driving system includes a cab in which a steering wheel control system, a base plate control system and a pedal system are provided; where the steering wheel control system includes a steering wheel diverter and a first telescopic adjustment device, which is connected to the steering wheel diverter to drive the steering wheel diverter to move; the base plate control system includes a base plate assembly and a second telescopic adjustment device connected to the base plate assembly to drive the base plate assembly to move up and down; the pedal system includes a pedal body and a third telescopic adjustment device connected to the pedal body to drive the pedal body to move. The multi-dimensional adjustable forklift driving system is capable of creating a relatively large space, thereby facilitating the driver getting on or off the vehicle.

14 Claims, 12 Drawing Sheets

(56) References Cited

U.S. PATENT DOCUMENTS

| | | | | |
|---|---|---|---|---|
| 5,449,199 A | * | 9/1995 | Heinrichs | B62D 1/184 |
| | | | | 280/775 |
| 5,813,699 A | * | 9/1998 | Donner | B60R 25/0211 |
| | | | | 280/775 |
| 2004/0211616 A1 | * | 10/2004 | Ueda | B60N 2/146 |
| | | | | 180/326 |
| 2005/0066764 A1 | * | 3/2005 | Burgstaler | G05G 1/405 |
| | | | | 74/512 |
| 2015/0096405 A1 | * | 4/2015 | Hoock | B62D 1/18 |
| | | | | 74/493 |
| 2016/0375860 A1 | * | 12/2016 | Lubischer | B62D 1/183 |
| | | | | 74/493 |
| 2019/0225253 A1 | | 7/2019 | Heusinger | |
| 2019/0308655 A1 | * | 10/2019 | Ochi | B62D 1/181 |
| 2021/0129896 A1 | * | 5/2021 | Ryne | B62D 1/187 |

FOREIGN PATENT DOCUMENTS

| | | | | | |
|---|---|---|---|---|---|
| DE | 3228623 A1 | | 3/1983 | | |
| DE | 10163879 A1 | * | 7/2003 | | B60T 7/065 |
| DE | 10257631 A1 | * | 11/2004 | | B60T 11/18 |
| EP | 3517401 A1 | | 7/2019 | | |
| JP | S60144431 A | | 7/1985 | | |
| KR | 20140066491 A | * | 6/2014 | | |
| SE | 1451037 A1 | * | 3/2015 | | |
| WO | WO-2004108492 A1 | * | 12/2004 | | B60T 7/065 |

OTHER PUBLICATIONS

The European Search Report for the European Application No. 21191202.7, dated Feb. 8, 2022.

* cited by examiner

MULTI-DIMENSIONAL ADJUSTABLE FORKLIFT DRIVING SYSTEM

CROSS REFERENCE TO RELATED APPLICATIONS

This application claims the priorities to Chinese patent application No. 202110388885.7, titled "MULTI-DIMENSIONAL ADJUSTABLE FORKLIFT DRIVING SYSTEM", filed with the China National Intellectual Property Administration on Apr. 12, 2021, and Chinese patent application No. 202120734469.3, titled "MULTI-DIMENSIONAL ADJUSTABLE FORKLIFT DRIVING SYSTEM", filed with the China National Intellectual Property Administration on Apr. 12, 2021, the entire disclosures of which are hereby incorporated by reference.

TECHNICAL FIELD

The present application relates to the technical field of vehicle control, in particular to a multi-dimensional adjustable forklift driving system.

BACKGROUND

In the conventional art shown in FIGS. 1 and 2, basic components of a cab of a forward-moving forklift include: a cab 10, a steering wheel diverter 20, a seat 30, a base plate assembly 40 and a pedal body 50.

H1: a distance between the top surface of the pedal body 50 and the bottom surface of the cab 10;

H2: a height difference between the base plate assembly 40 and the pedal body 50;

H3: a height difference between the steering wheel diverter 20 and the base plate assembly 40;

H4: a height difference between the steering wheel diverter 20 and the seat 30;

H5: a lateral distance between the steering wheel diverter 20 and the seat 30;

H6: a height difference between the seat 30 and the base plate assembly 40;

H7: a width of the cab 10;

H8: a width occupied by the pedal body 50;

H9: an effective width of the bottom plate assembly 40.

Among them, H1, H2, H3, H4, H5, H6 directly define a space for getting on or off the vehicle, which determines the convenience of getting on or off the vehicle. H7 is a width of the cab 10, which is generally limited in the forklift industry, that is, the width of H7 is limited. The width H7 is generally divided into two parts, which are respectively H8 and H9, and H8 is the width occupied by the pedal body 50, and H9 is the effective width of the bottom plate assembly 40, which defines a space for feet of a driver while driving. However, due to a space size in the cab and structural limitations of various parts of the cab, a driver is unable to get on or off the vehicle conveniently.

Therefore, a technical issue to be addressed presently by those skilled in the art is to prevent the driver from being unable to get on or off the vehicle conveniently.

SUMMARY

An object of the present application is to provide a multi-dimensional adjustable forklift driving system capable of creating a larger space for getting on or off the vehicle, thereby facilitating a driver to get on or off the vehicle.

In order to achieve the above object, the present application provides a multi-dimensional adjustable forklift driving system, including a cab in which a steering wheel control system, a base plate control system and a pedal system are provided; and the steering wheel control system includes a steering wheel diverter and a first telescopic adjustment device connected to the steering wheel diverter, and the first telescopic adjustment device is configured to drive the steering wheel diverter to move for adjusting a space for driver to get on or off the vehicle; and the base plate control system includes a base plate assembly and a second telescopic adjustment device connected to the base plate assembly, and the second telescopic adjustment device is configured to drive the base plate assembly to move up and down; and the pedal system includes a pedal body and a third telescopic adjustment device connected to the pedal body, and the third telescopic adjustment device is configured to drive the pedal body to extend or retract.

In an embodiment, the multi-dimensional adjustable forklift driving system further includes a mounting frame fixedly connected to a frame of the cab, the first telescopic adjustment device includes a telescopic sliding mechanism connected to the mounting frame and the steering wheel diverter, which is configured to drive the steering wheel diverter to move.

In an embodiment, the first telescopic adjustment device further includes a telescopic swing mechanism connected to the telescopic sliding mechanism and the mounting frame, which is configured to drive the steering wheel diverter to swing upward and downward.

In an embodiment, the telescopic swing mechanism includes a swing bracket and a first telescopic drive assembly, and the swing bracket is hinged with the mounting frame, and both ends of the first telescopic drive assembly are respectively hinged with the mounting frame and the swing bracket.

In an embodiment, the telescopic sliding mechanism includes a first linear guide rail and a second telescopic drive assembly; a fixed end of the first linear guide rail is fixedly connected to the swing bracket, and a sliding end of the first linear guide rail is fixedly connected to the steering wheel diverter through a steering wheel mounting bracket; both ends of the second telescopic drive assembly are respectively hinged with the swing bracket and the steering wheel mounting bracket.

In an embodiment, the first telescopic drive assembly and the second telescopic drive assembly are respectively a first electric push rod and a second electric push rod.

In an embodiment, the second telescopic adjustment device is specifically a third electric push rod, and further includes a mounting base in a sliding connection to the base plate assembly; a fixed end of the third electric push rod is hinged with the mounting base, and a free end of the third electric push rod is hinged with the base plate assembly.

In an embodiment, the third telescopic adjustment device includes a second linear guide rail and a third telescopic drive assembly, a fixed end of the second linear guide rail is fixedly connected to a frame of the cab, a sliding end of the second linear guide is fixedly connected to the pedal body; the third telescopic drive assembly is specifically a fourth electric push rod, a fixed end of the fourth electric push rod is hinged with the frame of the cab, and a free end of the fourth electric push rod is hinged with the pedal body.

In an embodiment, the multi-dimensional adjustable forklift driving system further includes a control system, the control system including a controller, and a seat sensing switch button and/or switch button group electrically connected to the controller;

the controller is triggered through the seat sensing switch to control movements of the first telescopic adjustment device, the second telescopic adjustment device, and the third telescopic adjustment device;

the controller is triggered through the switch button group to control movements of the first telescopic adjustment device and the second telescopic adjustment device;

With respect to the above background technology, the multi-dimensional adjustable forklift driving system provided by embodiments of the present application includes the cab in which the steering wheel control system, the base plate control system and the pedal system are provided; the steering wheel control system includes the steering wheel diverter and the first telescopic adjustment device, which is connected to the steering wheel diverter to drive the steering wheel diverter to move along directions away from or approaching the seat and/or the base plate assembly, so as to adjust a space for driver to get on or off the vehicle; the base plate control system includes the base plate assembly and the second telescopic adjustment device connected to the base plate assembly to drive the base plate assembly to move up and down, so as to adjust the space for driver to get on or off the vehicle; the pedal system includes the pedal body and the third telescopic adjustment device connected to the pedal body to drive the pedal body to extend or retract, so as to adjust the space for driver to get on or off the vehicle. In this way, adjustment can be achieved by the first telescopic adjustment device, the second telescopic adjustment device, and the third telescopic adjustment device. On the one hand, when a driver is getting on or off the vehicle, a larger space may be created, thereby facilitating the driver getting on or off the vehicle; on the other hand, after the driver has sat still, the steering wheel diverter, the base plate assembly and the pedal body may be quickly restored to a drivable state according to needs of the driver, thereby improving work efficiency of the driver.

BRIEF DESCRIPTION OF THE DRAWINGS

For more clearly illustrating embodiments of the present application or the technical solutions in the conventional technology, drawings referred to for describing the embodiments or the conventional technology will be briefly described hereinafter. Apparently, drawings in the following description are only examples of the present application, and for the person skilled in the art, other drawings may be obtained based on the set drawings without any creative efforts.

REFERENCE NUMERALS IN THE FIGURES

10: cab, 101: frame, 20: steering wheel, 30: seat, 40: base plate assembly, 50: pedal body;

2: steering wheel control system, 21: mounting frame, 22: first electric push rod, 23: swing bracket, 24: steering wheel mounting bracket, 25: first linear guide rail, 26: second electric push rod;

4: bottom plate control system, 41: mounting base, 42: third electric push rod;

5: pedal system, 51: second linear guide rail, 52: fourth electric push rod.

DETAILED DESCRIPTION OF THE EMBODIMENTS

The technical solutions according to the embodiments of the present application will be described clearly and completely as follows in conjunction with the drawings in the embodiments of the present application. It is apparent that the described embodiments are only a part of the embodiments according to the present application, rather than all of the embodiments. Based on the embodiments of the present application, all other embodiments obtained without creative efforts by those of ordinary skill in the art shall fall within the protection scope of the present application.

A core of the present application is to provide a multi-dimensional adjustable forklift driving system, which may create a larger boarding space, thereby facilitating a driver to get on or off the vehicle.

In order to enable those skilled in the art to better understand solutions of the present application, the present application will be further described in detail below with reference to the accompanying drawings and specific embodiments.

It should be noted that directional terms "above, below, left, and right" described below are all defined based on the accompanying drawings of the specification.

Figure 1:
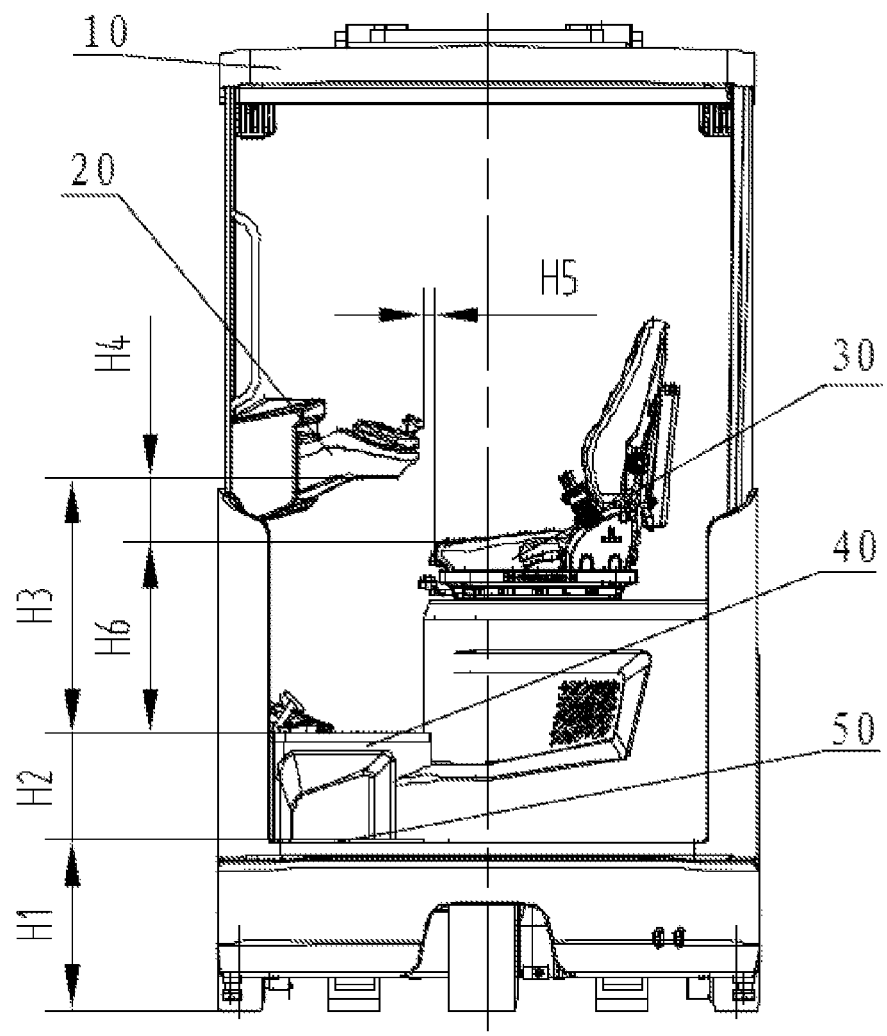
FIG. 1 is a structural schematic diagram of a driving system in the conventional art.
Figure 2:
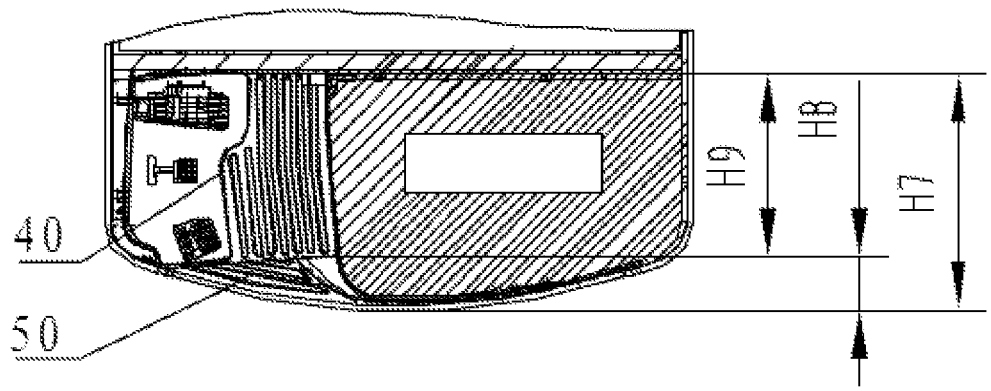
FIG. 2 is a top view of a driving system in the conventional art.
Figure 3:
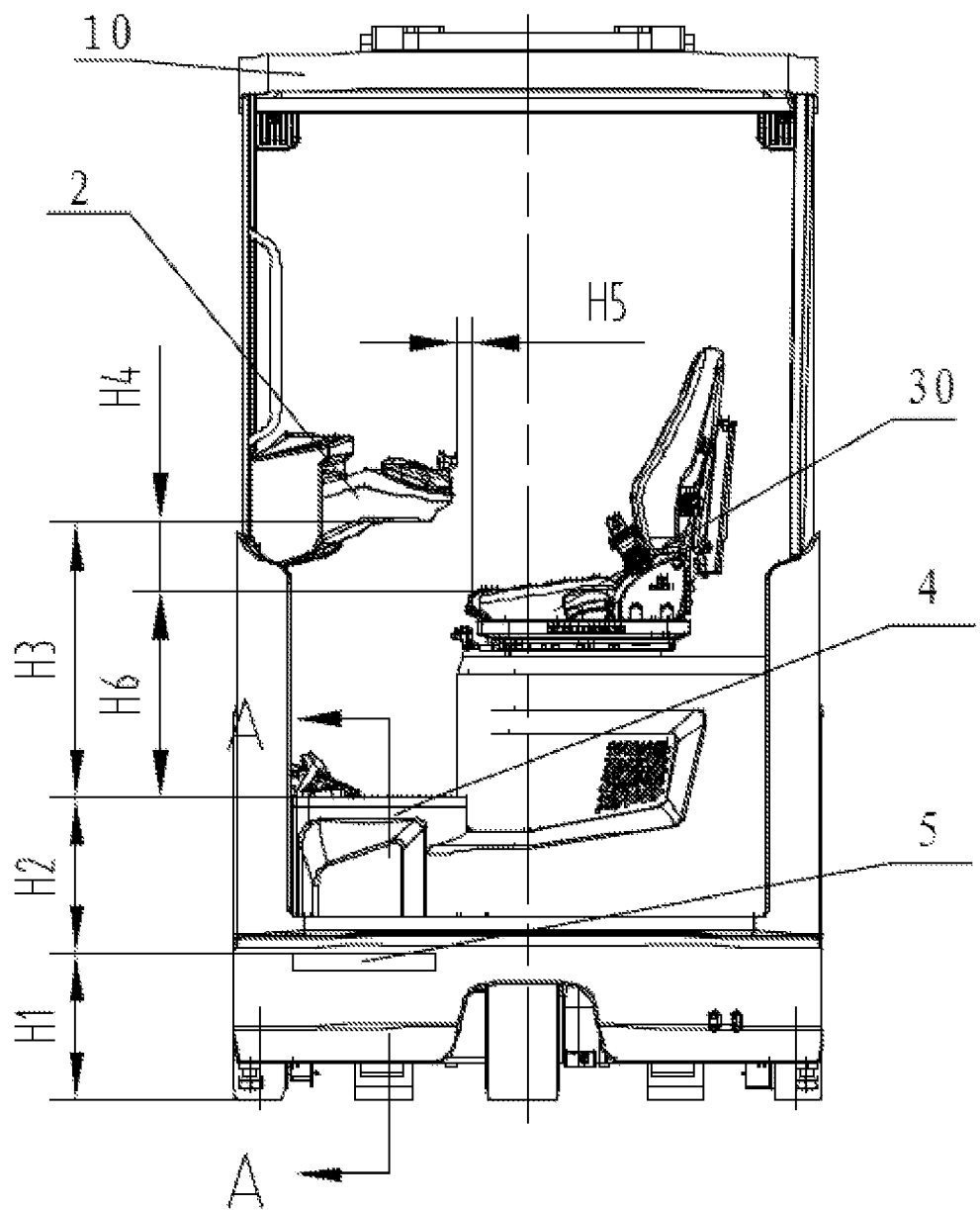
FIG. 3 is a structural schematic diagram of a multi-dimensional adjustable forklift driving system provided by an embodiment of the present application.
Figure 4:
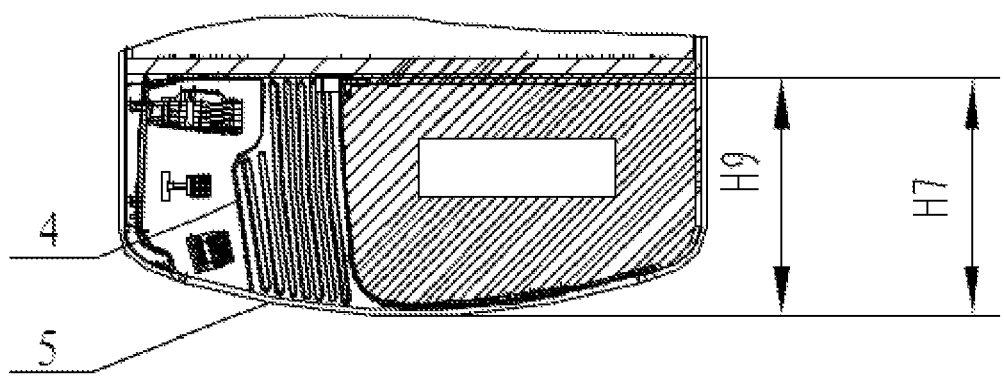
FIG. 4 is a top view of a pedal body in a multi-dimensional adjustable forklift driving system provided by an embodiment of the present application, when the pedal body is retracted.
Figure 5:
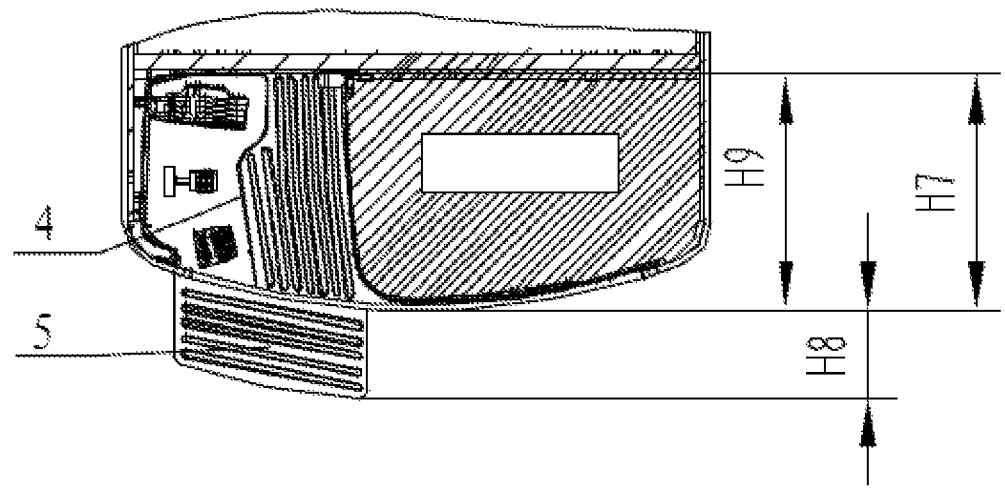
FIG. 5 is a top view of a pedal body in a multi-dimensional adjustable forklift driving system provided by an embodiment of the present application, when the pedal body is extended.
Figure 6:
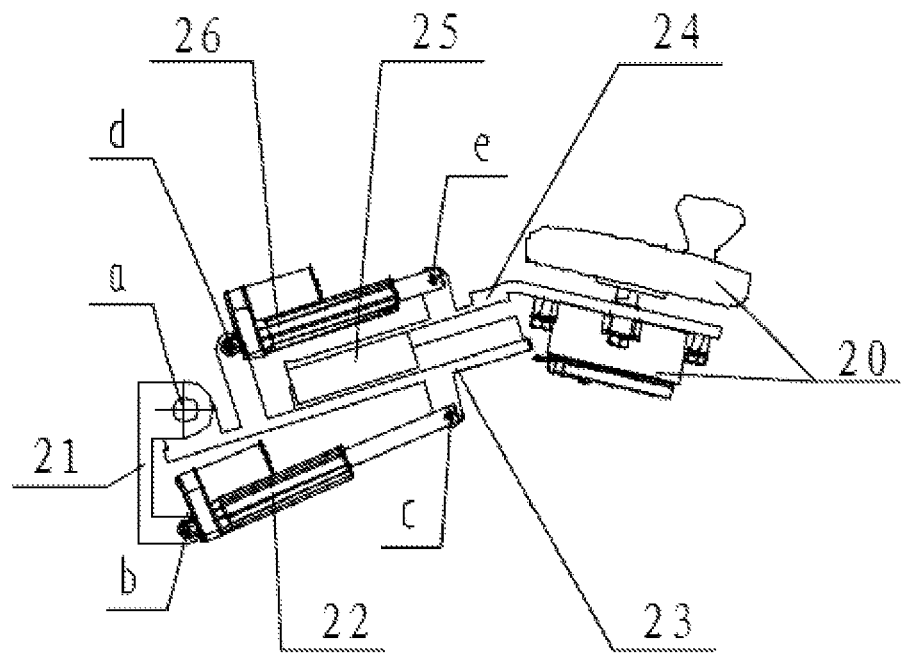
FIG. 6 is a structural schematic diagram of a steering wheel control system.
Figure 7:
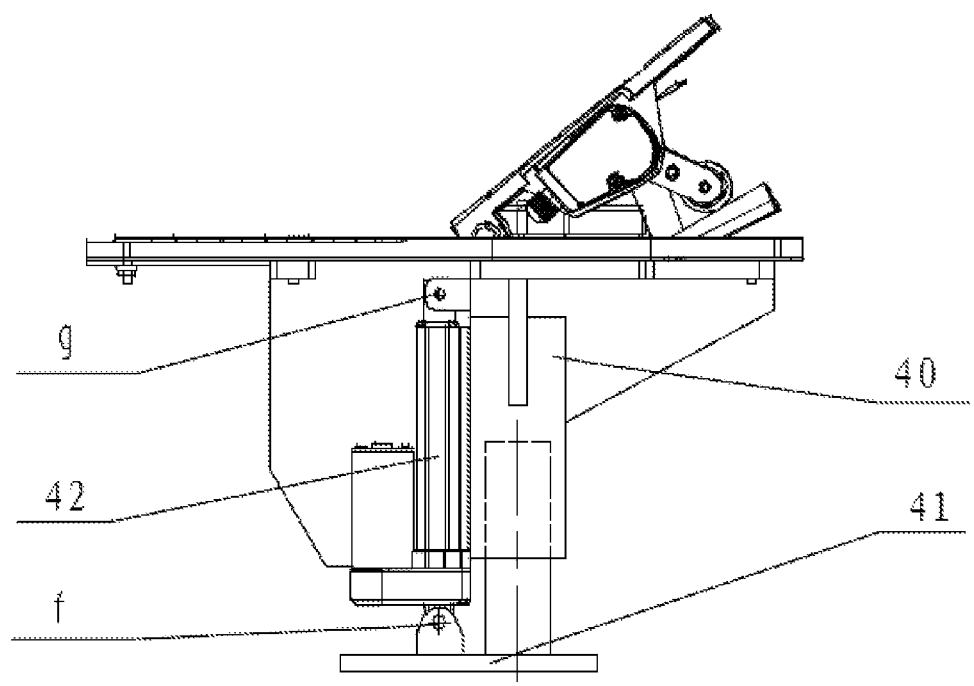
FIG. 7 is a structural schematic diagram of a base plate control system.
Figure 8:
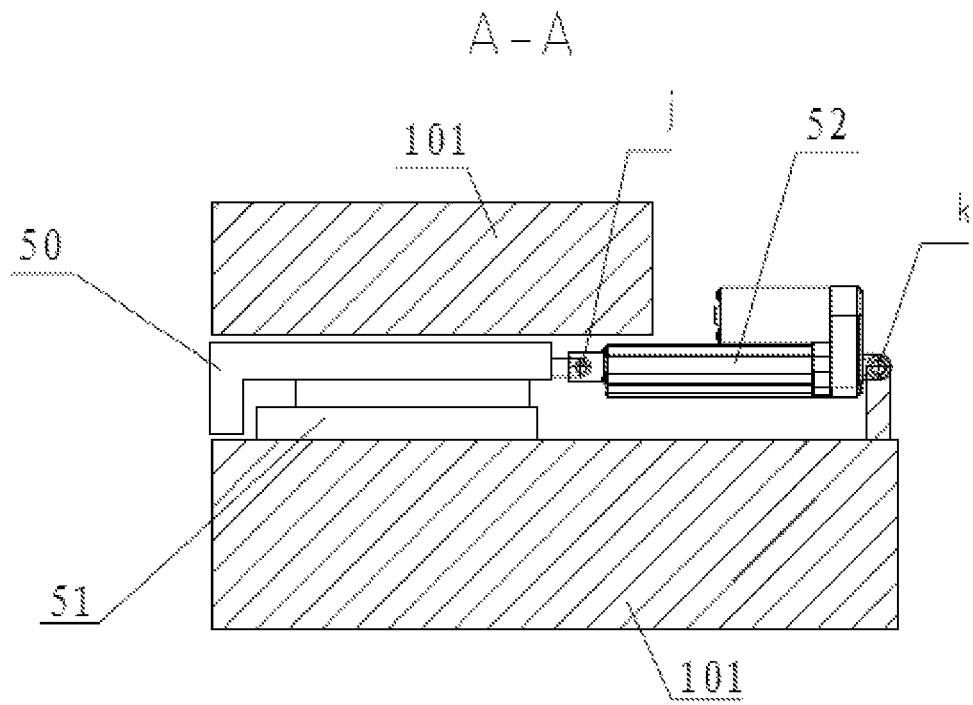
FIG. 8 is a schematic diagram of a cross-sectional structure at A-A when the pedal body in FIG. 3 is retracted.
Figure 9:
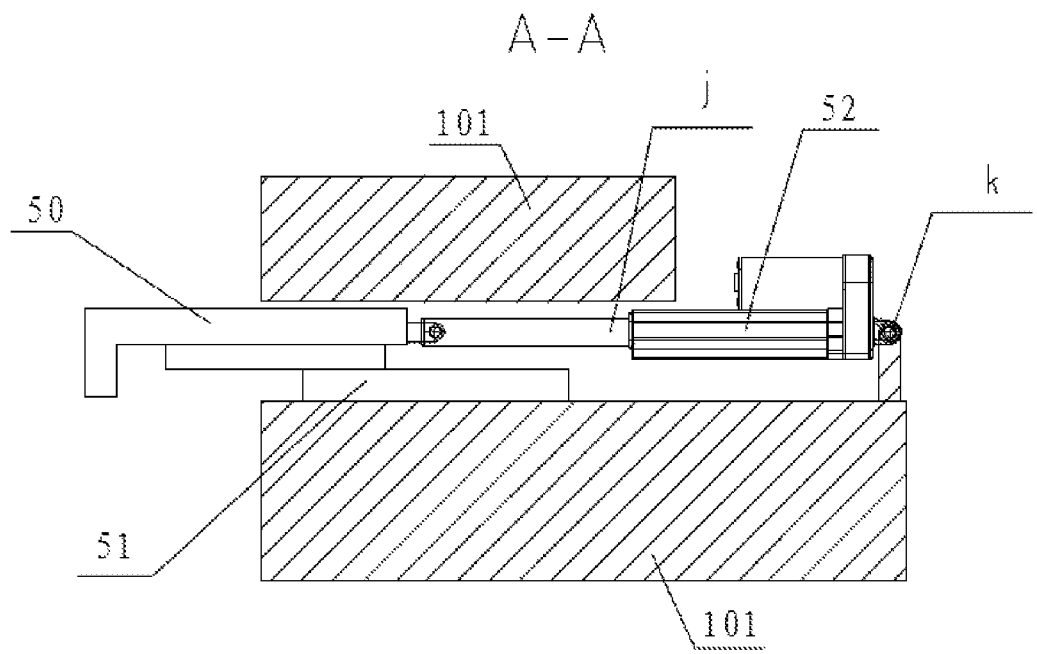
FIG. 9 is a schematic diagram of a cross-sectional structure at A-A when the pedal body in FIG. 3 is extended.
Figure 10:
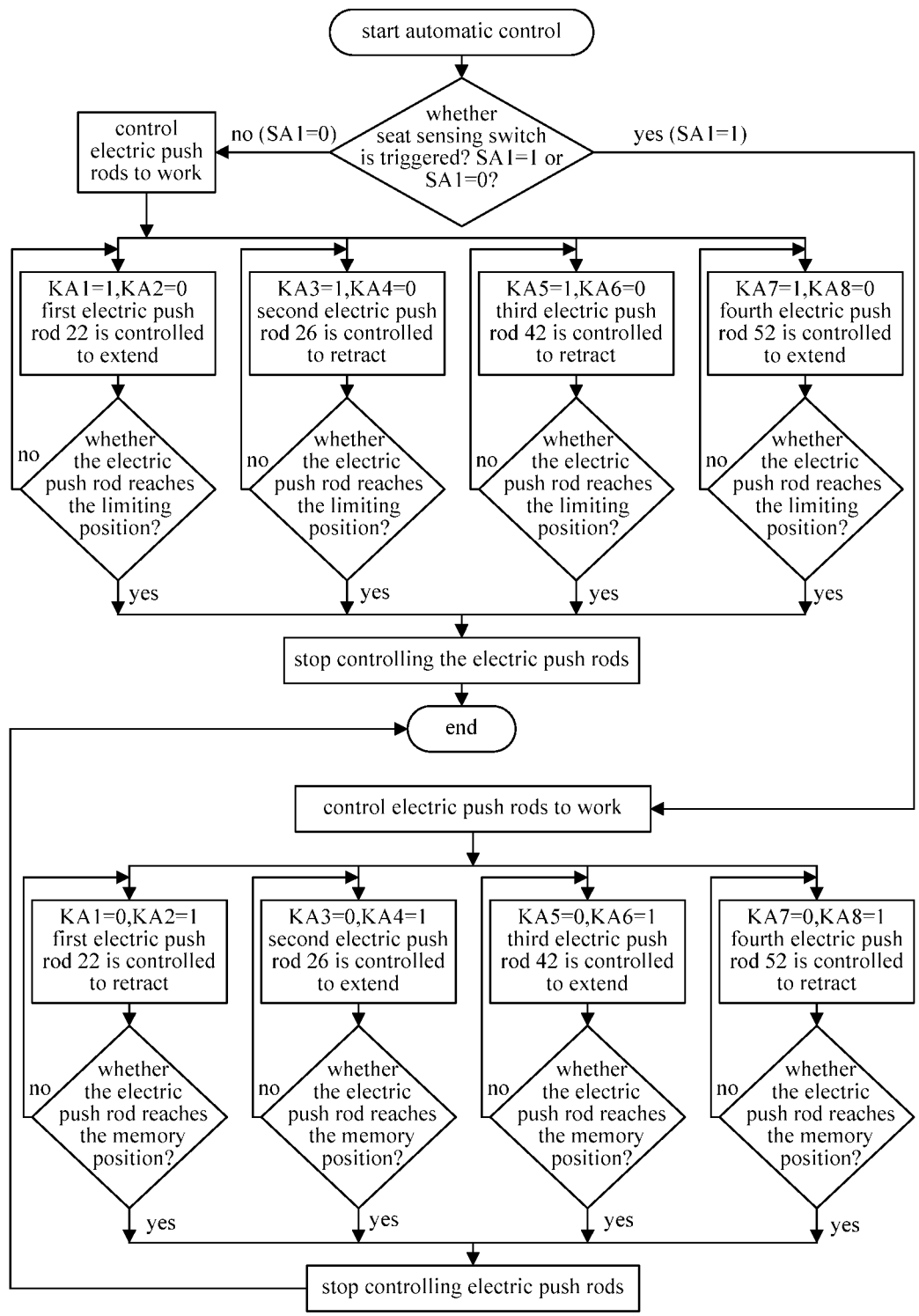
FIG. 10 is an automatic control flowchart of a multi-dimensional adjustable forklift driving system provided by an embodiment of the present application.
Figure 11:
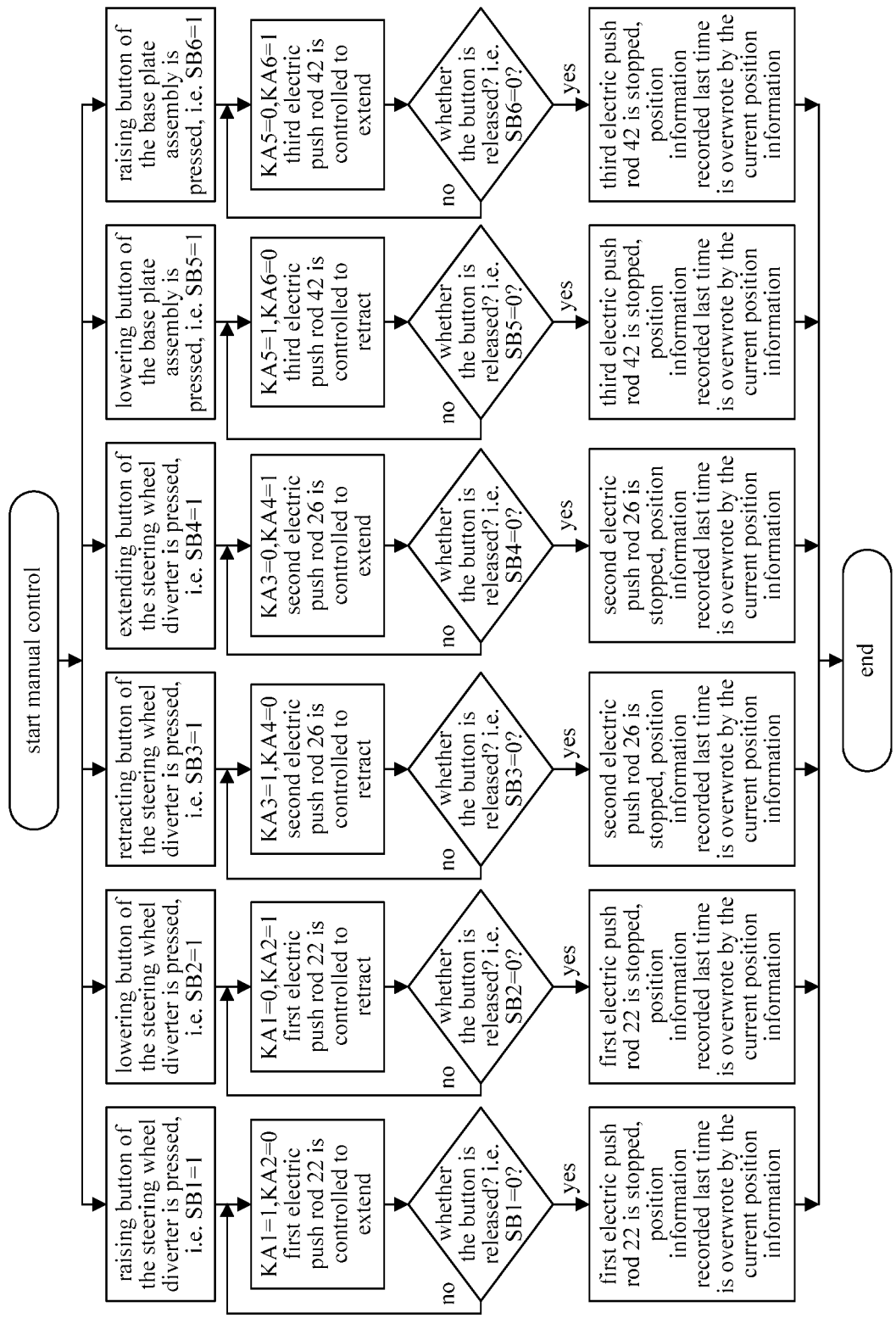
FIG. 11 is a manual control flow chart of a steering wheel control system and a base plate control system.
Figure 12:
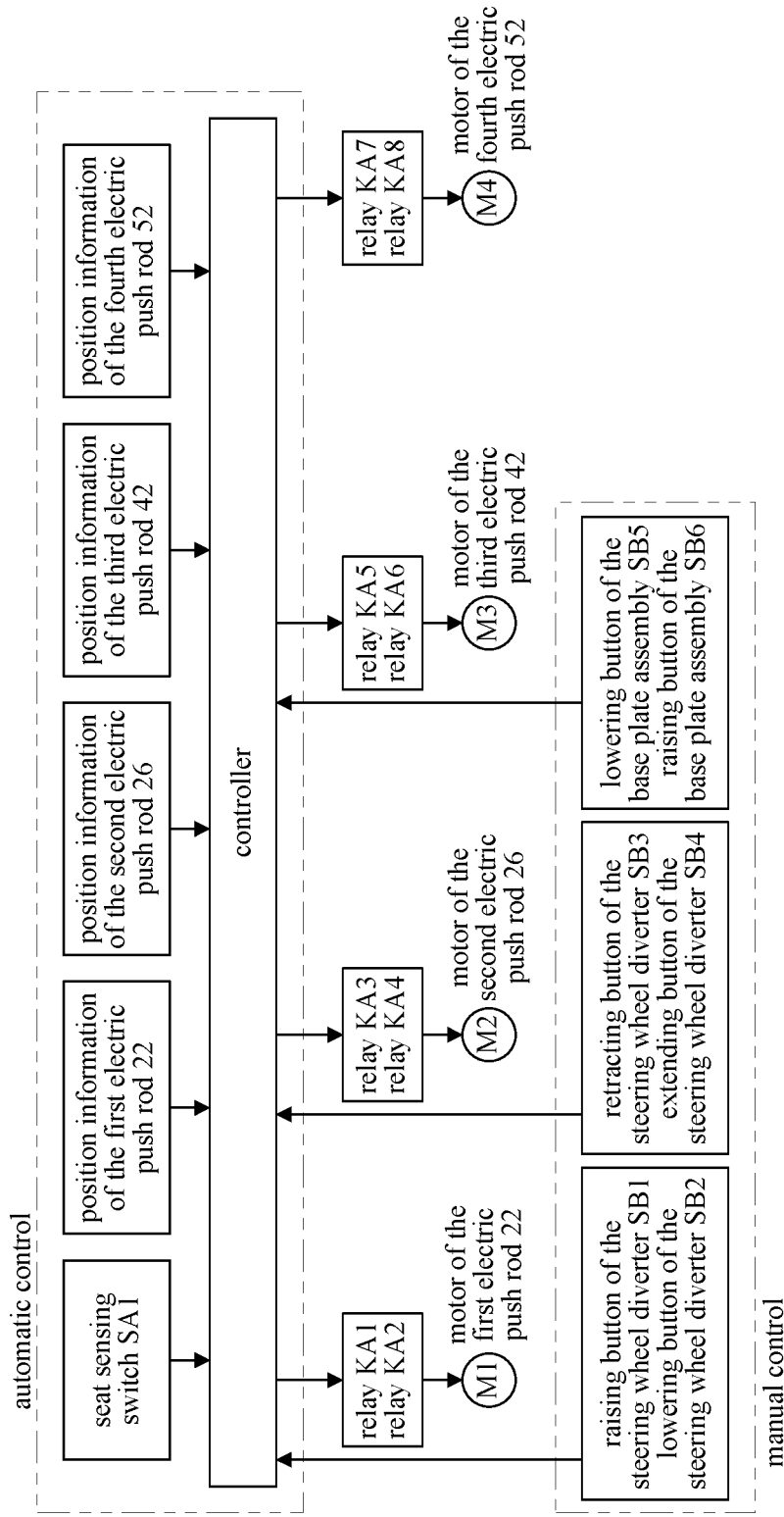
FIG. 12 is a main control block diagram of a multi-dimensional adjustable forklift driving system.
Figure 13:
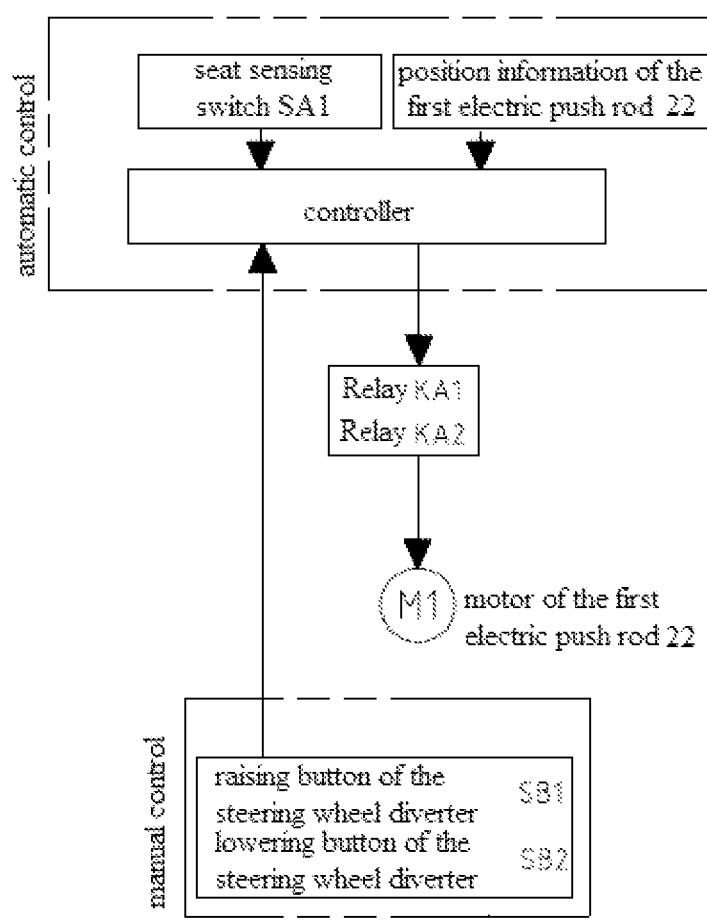
FIG. 13 is a swing control block diagram of a steering wheel diverter.
Figure 14:
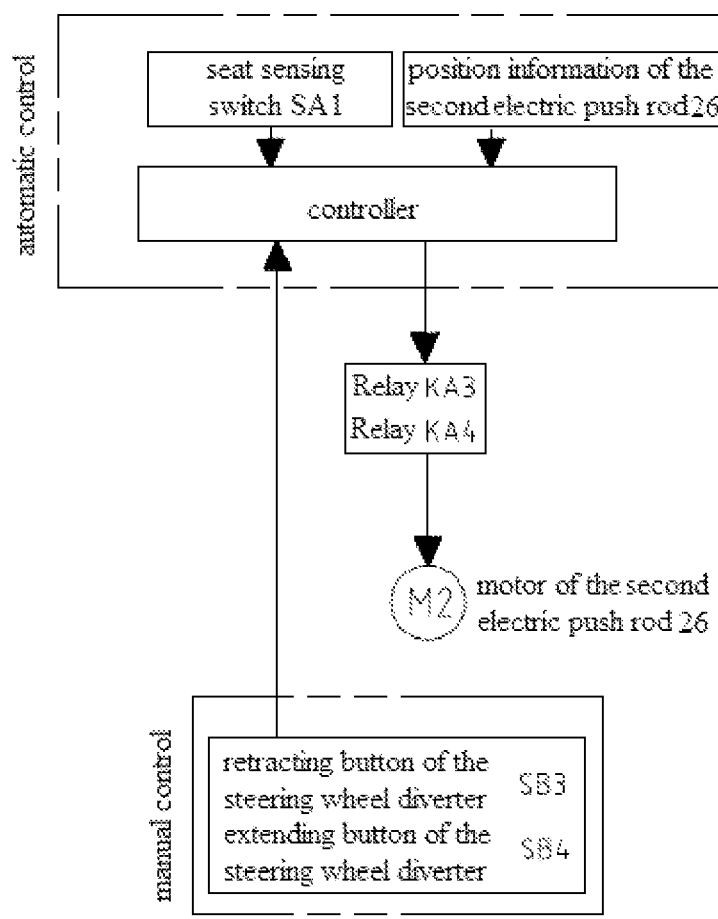
FIG. 14 is an extending and retracting control block diagram of a steering wheel diverter.
Figure 15:
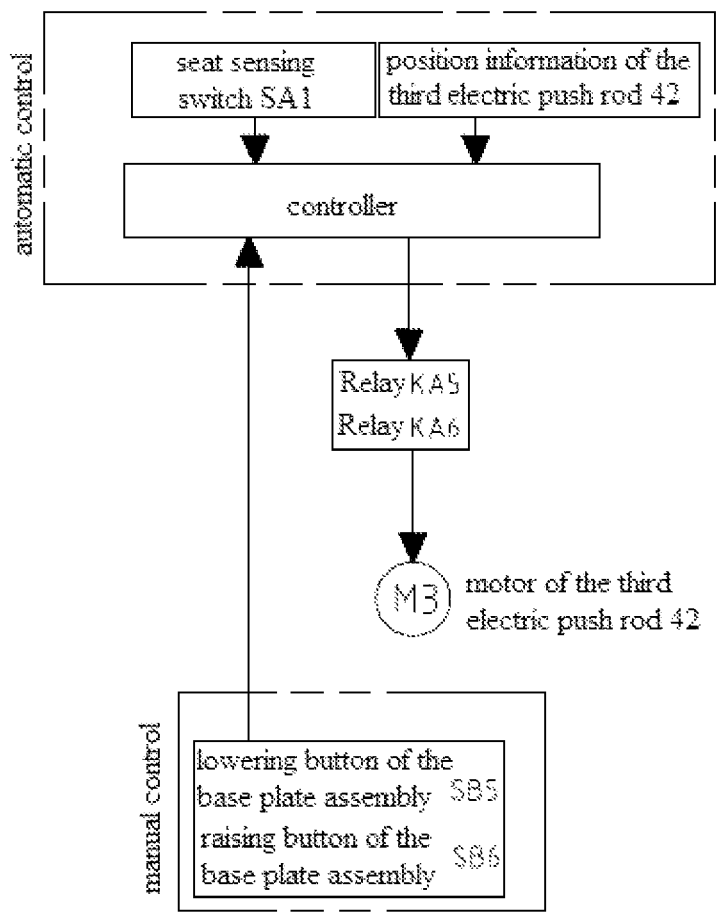
FIG. 15 is a lifting control block diagram of a bottom plate assembly.
Figure 16:
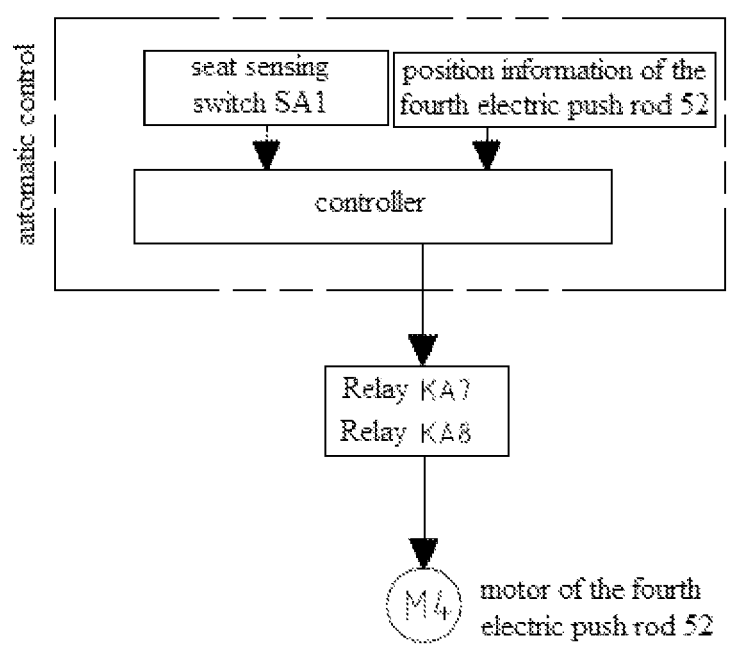
FIG. 16 is an extending and retracting control block diagram of a pedal body.

Reference is made to FIGS. 3-16, and FIG. 3 is a structural schematic diagram of a multi-dimensional adjustable forklift driving system provided by an embodiment of the present application; FIG. 4 is a top view of a pedal body in a multi-dimensional adjustable forklift driving system provided by an embodiment of the present application, when the pedal body is retracted; FIG. 5 is a top view of a pedal body in a multi-dimensional adjustable forklift driving system provided by an embodiment of the present application, when the pedal body is extended; FIG. 6 is a structural schematic diagram of a steering wheel control system; FIG. 7 is a structural schematic diagram of a base plate control system; FIG. 8 is a schematic diagram of a cross-sectional structure at A-A when the pedal body in FIG. 3 is retracted; FIG. 9 is a schematic diagram of a cross-sectional structure at A-A when the pedal body in FIG. 3 is extended; FIG. 10 is an automatic control flowchart of a multi-dimensional adjustable forklift driving system provided by an embodiment of the present application; FIG. 11 is a manual control flow chart of a steering wheel control system and a base plate control system; FIG. 12 is a main control block diagram of a multi-dimensional adjustable forklift driving system; FIG. 13 is a swing control block diagram of a steering wheel diverter; FIG. 14 is an extending and retracting control block diagram of a steering wheel diverter; FIG. 15 is a lifting control block diagram of a bottom plate assembly; FIG. 16 is an extending and retracting control block diagram of a pedal body.

A multi-dimensional adjustable forklift driving system provided by embodiments of the present application includes a cab 10, in which a steering wheel control system 2, a base plate control system 4 and a pedal system 5 are provided, and the steering wheel control system 2 includes a steering wheel diverter 20 and a first telescopic adjustment device connected to the steering wheel diverter 20, and the first telescopic adjustment device is configured to drive the steering wheel diverter 20 to move along directions away from or approaching the seat 30 and/or the base plate assembly 40, so as to adjust a space for driver to get on or off the vehicle; the base plate control system 4 includes a base plate assembly 40 and a second telescopic adjustment device connected to the base plate assembly 40, and the second telescopic adjustment device is configured to drive the base plate assembly 40 to move up and down, so as to adjust the space for driver to get on or off the vehicle; the pedal system 5 includes a pedal body 50 and a third telescopic adjustment device connected to the pedal body 50, and the third telescopic adjustment device is configured to drive the pedal body 50 to extend and retract, so as to adjust the space for driver to get on or off the vehicle.

The above arrangement method, adjustment is achieved through the first telescopic adjustment device, the second telescopic adjustment device, and the third telescopic adjustment device. On the one hand, when a driver is getting on or off the vehicle, a larger space may be created, thereby facilitating the driver getting on or off the vehicle; on the other hand, after the driver has sat still, the steering wheel diverter 20, the base plate assembly 40 and the pedal body 50 may be quickly restored to a drivable state according to needs of the driver, thereby improving work efficiency of the driver.

Further, in one of the embodiments, the multi-dimensional adjustable forklift driving system further includes a mounting frame 21 fixedly connected to a frame 101 of the cab 10, and the first telescopic adjustment device includes a telescopic sliding mechanism connected to the mounting frame 21 and the steering wheel diverter 20, which can further drive the steering wheel diverter 20 to move. Specifically, the telescopic sliding mechanism can drive the steering wheel diverter 20 to move in a horizontal direction. When the driver is getting on or off the vehicle, the steering wheel diverter 20 is driven to move in the direction away from the seat 30 through the telescopic sliding mechanism, thereby releasing a space for the driver to get on or off the vehicle, which is more conducive for the driver to sit on or leave the seat 30. When the driver has sat on the seat 30, the steering wheel diverter 20 is driven to move in the direction close to the seat 30 through the telescopic sliding mechanism until the steering wheel steering diverter 20 reaches a position where the driver is convenient to operate the steering wheel steering diverter 20, which is beneficial for improving the work efficiency of the driver.

Based on the above, as another specific embodiment, the first telescopic adjustment device further includes a telescopic swing mechanism connected to the telescopic sliding mechanism and the mounting frame 21, and the telescopic swing mechanism can drive the steering wheel diverter 20 to swing upward and downward.

That is, on the basis that the aforementioned telescopic sliding mechanism can drive the steering wheel diverter 20 to move, the telescopic sliding mechanism and the steering wheel diverter 20 can be further driven by the telescopic swing mechanism to swing upward and downward as a whole, thereby facilitating releasing a space for the driver to get on or off the vehicle in a greater extent.

Specifically, the telescopic swing mechanism specifically includes a swing bracket 23 and a first telescopic drive assembly, and the telescopic sliding mechanism specifically includes a first linear guide rail 25 and a second telescopic drive assembly. Preferably, both the first telescopic drive assembly and the second telescopic drive assembly may be embodied as electric push rods, and the first telescopic drive assembly is a first electric push rod 22, and the second telescopic drive assembly is a second electric push rod 26. Of course, according to actual needs, the telescopic drive assembly may also be embodied as a telescopic oil cylinder or an air cylinder assembly.

Among them, the swing bracket 23 is hinged with the mounting frame 21 at a hinge point a. That is, the swing bracket 23 may swing upward and downward around the hinge point a. A fixed end of the first electric push rod 22 is hinged with the mounting frame 21 at a hinge point b, and a free end of the first electric push rod 22 is hinged with the swing bracket 23 at a hinge point c. Since the first electric push rod 22 can extend and retract, and can withstand axial thrust and pulling force, the swing bracket 23 may swing up or down, around the hinge point a, relative to the mounting frame 21 when the first electric push rod 22 is extending or retracting.

In addition, a fixed end of the first linear guide rail 25 is fixedly connected to the swing bracket 23, and a sliding end of the first linear guide rail 25 is fixedly connected to the steering wheel diverter 20 through a steering wheel mounting bracket 24. Due to the fixed end and the sliding end of the first linear guide rail 25 may slide relatively, the steering wheel mounting bracket 24 and the swing bracket 23 may slide relatively in a straight line; a fixed end of the second electric push rod 26 is hinged with the swing bracket 23 at a hinge point d, a free end of the second electric push rod 26 is hinged with the steering wheel mounting bracket 24 at a hinge point e. When the second electric push rod 26 is extending or retracting, the steering wheel mounting bracket 24 may perform extending or retracting linear motion relative to the swing bracket 23.

It should be noted that the hinge point a, the hinge point b, the hinge point c, the hinge point d, and the hinge point e have different axes from each other. Also, the steering wheel diverter 20 is fixedly connected to the steering wheel mounting bracket 24, which is a steering control system of an electric steering vehicle. The specific content may refer to the conventional art, which will not be repeated here.

As a specific embodiment, the above second telescopic adjustment device is specifically a third electric push rod 42, and at the same time, it further includes a mounting base 41, which is in a sliding connection to the base plate assembly 40, and is fixedly connected to the frame 101 of the cab 10. The bottom plate assembly 40 can only slide in a vertical direction. Of course, the sliding connection may be implemented through many methods, such as connection through a linear guide rail, or socketed connection through a pipe sleeve. A fixed end of the third electric push rod 42 is hinged with the mounting base 41 at a hinge point f, and a free end of the third electric push rod 42 is hinged with the bottom plate assembly 40 at a hinge point g. Extending and retracting movements of the third electric push rod 42 can respectively drive the bottom plate assembly 40 to move up and down relative to the mounting base 41.

As a specific embodiment, the third telescopic adjustment device includes a second linear guide rail 51 and a third telescopic drive assembly. A fixed end of the second linear guide rail 51 is fixedly connected to the frame 101 of the cab 10, and a sliding end of the second linear guide rail 51 is fixedly connected to the pedal body 50, so that the pedal body 50 may perform linear sliding motion relative to the cab 10. Also, the third telescopic drive assembly is specifically a fourth electric push rod 52. A fixed end of the fourth electric push rod 52 is hinged with the frame 101 of the cab 10 at a hinge point k, and a free end of the fourth electric push rod 52 is hinged with the pedal body 50 at a hinge point j. Based on the above structure, the pedal body 50 can perform a linear extending or retracting movement after being pushed or pulled by the fourth electric push rod 52.

It should be noted that the above pedal body 50 is only used when the driver getting on or off the vehicle, and is not involved in use by the driver in a normal operating state.

In order to optimize the above embodiment, the multi-dimensional adjustable forklift driving system further includes a control system, which is electrically connected to the first telescopic adjustment device, the second telescopic adjustment device, and/or the third telescopic adjustment device, and it is configured to control movements of the first telescopic adjustment device, the second telescopic adjustment device and/or the third telescopic adjustment device.

Specifically, the above control system may be provided to include an automatic control system and/or a manual control system. Among them, the automatic control system includes a controller and a seat sensing switch electrically connected to the controller. The seat sensing switch is configured to trigger the controller to control movements of the first telescopic adjustment device, the second telescopic adjustment device, and the third telescopic adjustment device. The manual control system includes a controller and a switch button group electrically connected to the controller, and the controller is triggered by the switch button group to control the start and stop of the first telescopic adjustment device and the second telescopic adjustment device. That is, the first telescopic adjustment device and the second telescopic adjustment device may be controlled separately by buttons, so that drivers with different heights and leg lengths may get a comfortable driving position to maintain a comfortable driving posture, thereby improving the comfort performance of the driver and relieving fatigue. Of course, the controller may be specifically embodied as PLC according to actual needs.

A control process of the automatic control system and the manual control system are respectively described below.

Automatic Control:

Step 1: obtaining a sensing signal of the seat sensor switch;

Step 2: determining whether the driver is seated still according to the sensing signal;

Step 3: If not, controlling the first electric push rod 22 of the steering wheel control system 2 to extend to a first preset position, controlling the second electric push rod 26 of the steering wheel control system 2 to retract to a second preset position, controlling the third electric push rod 42 of the base plate control system 4 to retract to a third preset position and controlling the fourth electric push rod 52 of the pedal system 5 to extend to a fourth preset position;

Step 4: If yes, controlling the first electric push rod 22 of the steering wheel control system 2 to retract to a first memory position, controlling the second electric push rod 26 of the steering wheel control system 2 to extend to a second memory position, controlling the third electric push rods 42 of the base plate control system 4 to extend to a third memory position and controlling the fourth electric push rod 52 of the pedal system 5 to retract to a fourth memory position.

Regarding the steps 1 and 2 above, it should be noted that the seat 30 that the driver sits has a seat sensing switch SA1 inside. The seat sensing switch SA1 is a technology well known to those skilled in the art. When the driver is sitting on the seat 30, SA1=1, and when the driver leaves the seat 30, SA1=0.

For the step 3, when the driver leaves the seat (SA1=0), the first electric push rod 22 of the steering wheel control system 2 is controlled by the controller to extend (relay KA1=1, relay KA2=0), to raise the steering wheel diverter 20; the second electric push rod 26 of the steering wheel control system 2 is controlled to retract (relay KA3=1, relay KA4=0), to retract the steering wheel diverter 20; the third electric push rod 42 of the base plate control system 4 is controlled to retract (relay KA5=1, relay KA6=0), to lower the bottom plate assembly 40; and the fourth electric push rod 52 of the control pedal system 5 is controlled to extend (relay KA7=1, relay KA8=0), to extend the pedal body 50. When the first electric push rod 22 extends to the first preset position, the first electric push rod 22 is controlled to stop; when the second electric push rod 26 retracts to the second preset position, the second electric push rod 26 is controlled to stop; when the third electric push rod 42 retracts to the third preset position, the third electric push rod 42 is controlled to stop; and when the fourth electric push rod 52 extends to the fourth preset position, the fourth electric push rod 52 is controlled to stop. The preset positions refer to the limiting positions that the corresponding electric push rod can reach.

For the step 4, when the driver is seated still (SA1=1), the first electric push rod 22 of the steering wheel control system 2 is controlled to retract (relay KA1=0, relay KA2=1), to lower the steering wheel diverter 20, the second electric push rod 26 of the steering wheel control system 2 is controlled to extend (relay KA3=0, relay KA4=1), to extend the steering wheel diverter 20; the third electric push rod 42 of the base plate control system 4 is controlled to extend (relay KA5=0, relay KA6=1), to raise the bottom plate assembly 40; and the fourth electric push rod 52 of the control pedal system 5 is controlled to retract (relay KA7=0, relay KA8=1) to retract the pedal body 50. When the first electric push rod 22 retracts to the first memory position, the first electric push rod 22 is controlled to stop; when the second electric push rod 26 extends to the second memory position, the second electric push rod 26 is controlled to stop; when the third electric push rod 42 extends to the third memory position, the third electric push rod 42 is controlled to stop; and when the fourth electric push rod 52 retracts to the fourth memory position, the fourth electric push rod 52 is controlled to stop. The memory positions refer to positions previously reached by the corresponding electric push rods, which can improve driving comfort performance for the driver.

Manual Switch Control:

For a control process of the steering wheel control system 2, the system is provided with a button SB1 for raising the steering wheel diverter 20, a button SB2 for lowering the steering wheel diverter 20, a button SB3 for retracting the steering wheel diverter 20, and a button SB4 for extending the steering wheel diverter 20. When a raising button of the steering wheel diverter 20 is pressed (SB1=1), the first electric push rod 22 is controlled by the controller to extend (relay KA1=1, relay KA2=0), to push the entire mechanism to swing upward (the steering wheel diverter 20 is raised); when a lowering button of the steering wheel diverter 20 is pressed (SB2=1), the first electric push rod 22 is controlled by the controller to retract (relay KA1=0, relay KA2=1), to pull the entire mechanism to swing downward (the steering wheel diverter 20 is lowered); when a retracting button of the steering wheel diverter 20 is pressed (SB3=1), the second electric push rod 26 is controlled by the controller to retract (relay KA3=1, relay KA4=0), to pull the entire mechanism to retract (the steering wheel diverter 20 is retracted); when a extending button of the steering wheel diverter 20 is pressed (SB4=1), the second electric push rod 26 is controlled by the controller to extend (relay KA3=0, relay KA4=1), to push the entire mechanism to extend (the steering wheel diverter 20 is extended).

It should be noted that, in the case that each of the above control actions is stopped, the controller reads and records position information that the electric push rods are located and overwrites the position information recorded last time at the same time.

For a control process of the base plate control system 4, the system is provided with a button SB5 for lowering the base plate assembly 40 and a button SB6 for raising the base plate assembly 40. The buttons SB5 and SB6 respectively control the third electric push rod 42 to extend and retract. When a lowering button of the bottom plate assembly 40 is pressed (SB5=1), the third electric push rod 42 is controlled by the controller to retract (relay KA5=1, relay KA6=0), to pull the entire bottom plate assembly 40 downward; when a raising button of the bottom plate assembly 40 is pressed (SB6=1), the third electric push rod 42 is controlled by the controller to extend (relay KA5=0, relay KA6=1), to push the entire bottom plate assembly 40 upward.

It should be noted that, in that case that each of the above control actions is stopped, the controller reads and records position information that the electric push rods are located and overwrites the position information recorded last time at the same time.

The multi-dimensional adjustable forklift driving system described in the above specific embodiments may be applied to a forklift, and other parts of the forklift may refer to the conventional art, which will not be detailed herein.

It should be noted that in this specification, relational terms such as first and second are only used to distinguish one entity from several other entities, rather than necessarily require or imply that actual relationship or order are exist between these entities.

The multi-dimensional adjustable forklift driving system provided by the present application has been introduced in detail above. Specific examples are used herein to describe the principle and implementation manner of the present application. The description of the above embodiments is only used to help understand the scheme and core ideas of the present application. It should be pointed out that for those of ordinary skill in the art, several improvements and modifications may be made to the present application without departing from the principle of the present application, and these improvements and modifications also fall within the protection scope of the claims of the present application.

The invention claimed is:

1. A multi-dimensional adjustable forklift driving system, comprising a cab in which a steering wheel control system, a base plate control system and a pedal system are provided; wherein the steering wheel control system comprises a steering wheel diverter and a first telescopic adjustment device connected to the steering wheel diverter, and the first telescopic adjustment device is configured to drive the steering wheel diverter to move for adjusting a space for a driver to get on or off a forklift; wherein the base plate control system comprises a base plate assembly and a second telescopic adjustment device connected to the base plate assembly, and the second telescopic adjustment device is configured to drive the base plate assembly to move up and down; wherein the pedal system comprises a pedal body and a third telescopic adjustment device connected to the pedal body, and the third telescopic adjustment device is configured to drive the pedal body to extend or retract, the third telescopic adjustment device comprises a first linear guide rail and a third telescopic drive assembly, a fixed end of the first linear guide rail is fixedly connected to a frame of the cab, a sliding end of the first linear guide is fixedly connected to the pedal body; and, the third telescopic drive assembly is specifically a first electric push rod, a fixed end of the first electric push rod is hinged with the frame of the cab, and a free end of the first electric push rod is hinged with the pedal body.

2. The multi-dimensional adjustable forklift driving system of claim 1, further comprising a mounting frame fixedly connected to the frame of the cab, wherein the first telescopic adjustment device comprises a telescopic sliding mechanism connected to the mounting frame and the steering wheel diverter, which is configured to drive the steering wheel diverter to move.

3. The multi-dimensional adjustable forklift driving system according to claim 2, further comprising a control system, wherein the control system comprising a controller, and a seat sensing switch electrically connected to the controller;

wherein the controller is triggered through the seat sensing switch to control movements of the first telescopic adjustment device, the second telescopic adjustment device, and the third telescopic adjustment device;

wherein the controller is triggered through the switch button group to control movements of the first telescopic adjustment device and the second telescopic adjustment device.

4. The multi-dimensional adjustable forklift driving system according to claim 2, wherein the first telescopic adjustment device further comprises a telescopic swing mechanism connected to the telescopic sliding mechanism and the mounting frame, which is configured to drive the steering wheel diverter to swing upward and downward.

5. The multi-dimensional adjustable forklift driving system according to claim 4, further comprising a control system, wherein the control system comprising a controller, and a seat sensing switch electrically connected to the controller;
wherein the controller is triggered through the seat sensing switch to control movements of the first telescopic adjustment device, the second telescopic adjustment device, and the third telescopic adjustment device;
wherein the controller is triggered through the switch button group to control movements of the first telescopic adjustment device and the second telescopic adjustment device.

6. The multi-dimensional adjustable forklift driving system according to claim 3, wherein the telescopic swing mechanism comprises a swing bracket and a first telescopic drive assembly, and the swing bracket is hinged with the mounting frame, and both ends of the first telescopic drive assembly are respectively hinged with the mounting frame and the swing bracket.

7. The multi-dimensional adjustable forklift driving system according to claim 4, further comprising a control system, wherein the control system comprising a controller, and a seat sensing switch electrically connected to the controller;
wherein the controller is triggered through the seat sensing switch to control movements of the first telescopic adjustment device, the second telescopic adjustment device, and the third telescopic adjustment device;
wherein the controller is triggered through the switch button group to control movements of the first telescopic adjustment device and the second telescopic adjustment device.

8. The multi-dimensional adjustable forklift driving system of claim 4, wherein the telescopic sliding mechanism comprises a second linear guide rail and a second telescopic drive assembly; a fixed end of the second linear guide rail is fixedly connected to the swing bracket, and, a sliding end of the second linear guide rail is fixedly connected to the steering wheel diverter through a steering wheel mounting bracket; and, both ends of the second telescopic drive assembly are respectively hinged with the swing bracket and the steering wheel mounting bracket.

9. The multi-dimensional adjustable forklift driving system according to claim 5, further comprising a control system, wherein the control system comprising a controller, and a seat sensing switch electrically connected to the controller;
wherein the controller is triggered through the seat sensing switch to control movements of the first telescopic adjustment device, the second telescopic adjustment device, and the third telescopic adjustment device;
wherein the controller is triggered through the switch button group to control movements of the first telescopic adjustment device and the second telescopic adjustment device.

10. The multi-dimensional adjustable forklift driving system according to claim 5, wherein the first telescopic drive assembly and the second telescopic drive assembly are respectively a second electric push rod and a third electric push rod.

11. The multi-dimensional adjustable forklift driving system according to claim 10, further comprising a control system, wherein the control system comprising a controller, and a seat sensing switch electrically connected to the controller;
wherein the controller is triggered through the seat sensing switch to control movements of the first telescopic adjustment device, the second telescopic adjustment device, and the third telescopic adjustment device;
wherein the controller is triggered through the switch button group to control movements of the first telescopic adjustment device and the second telescopic adjustment device.

12. The multi-dimensional adjustable forklift driving system according to claim 1, wherein the second telescopic adjustment device is a second electric push rod, and further comprises a mounting base in a sliding connection to the base plate assembly; and, a fixed end of the second electric push rod is hinged with the mounting base, and a free end of the second electric push rod is hinged with the base plate assembly.

13. The multi-dimensional adjustable forklift driving system according to claim 12, further comprising a control system, wherein the control system comprising a controller, and a seat sensing switch electrically connected to the controller;
wherein the controller is triggered through the seat sensing switch to control movements of the first telescopic adjustment device, the second telescopic adjustment device, and the third telescopic adjustment device;
wherein the controller is triggered through the switch button group to control movements of the first telescopic adjustment device and the second telescopic adjustment device.

14. The multi-dimensional adjustable forklift driving system according to claim 1, further comprising a control system, wherein the control system comprising a controller, and a seat sensing switch button electrically connected to the controller;
wherein the controller is triggered through the seat sensing switch to control movements of the first telescopic adjustment device, the second telescopic adjustment device, and the third telescopic adjustment device;
wherein the controller is triggered through the switch button group to control movements of the first telescopic adjustment device and the second telescopic adjustment device.

* * * * *